(12) United States Patent
Ogawa et al.

(10) Patent No.: US 6,509,928 B1
(45) Date of Patent: Jan. 21, 2003

(54) IMAGE PICKUP APPARATUS WITH VERTICAL TRANSFER PULSES SUBSTANTIALLY THE SAME FOR TWO DRIVING FUNCTION MODES

(75) Inventors: Yoshitaka Ogawa, Hachioji (JP); Takayuki Kijima, Akiruno (JP); Junzo Sakurai, Koganei (JP); Masaki Yokouchi, Kokubunji (JP)

(73) Assignee: Olympus Optical Co. Ltd., Tokyo (JP)

( * ) Notice: Subject to any disclaimer, the term of this patent is extended or adjusted under 35 U.S.C. 154(b) by 0 days.

(21) Appl. No.: 09/161,488

(22) Filed: Sep. 28, 1998

(30) Foreign Application Priority Data

Sep. 30, 1997 (JP) .............................................. 9-281075

(51) Int. Cl.$^7$ ................................................ H04N 3/14
(52) U.S. Cl. ...................... 348/312; 348/314; 348/320
(58) Field of Search ................................ 348/294–298, 348/302–304, 307–312, 314–317, 319–324; H04N 3/14

(56) References Cited

U.S. PATENT DOCUMENTS

| | | | |
|---|---|---|---|
| 4,748,507 A | * 5/1988 | Gural | ........................ 348/219 |
| 4,858,020 A | * 8/1989 | Homma | ....................... 358/451 |
| 4,910,599 A | * 3/1990 | Hashimoto | ................... 348/240 |
| 5,196,939 A | * 3/1993 | Elabd | .......................... 348/314 |
| 5,262,871 A | * 11/1993 | Wilder | ........................ 348/307 |
| 5,668,597 A | * 9/1997 | Parulski | ...................... 348/315 |

* cited by examiner

*Primary Examiner*—Ngoc-Yen Vu
(74) *Attorney, Agent, or Firm*—Armstrong, Westerman & Hattori, LLP (57) ABSTRACT

In an image pickup apparatus comprising a CCD image pickup device made up of a plurality of photodiodes which are two-dimensionally arrayed, and vertical and horizontal shift registers, and a CPU for driving and controlling the CCD image pickup device, the CPU has a driving function in a mode for performing normal transfer of electric charges for reading in the vertical shift registers of the CCD image pickup device, and a driving function in a mode for performing high-speed sweep transfer to purge out useless electric charges, and sets the pulse width and cycle of vertical transfer pulses for driving the vertical shift register to be substantially the same in the above two modes.

5 Claims, 9 Drawing Sheets

IMAGE PICKUP APPARATUS WITH VERTICAL TRANSFER PULSES SUBSTANTIALLY THE SAME FOR TWO DRIVING FUNCTION MODES

BACKGROUND OF THE INVENTION

1. Field of the Invention

The present invention relates to an image pickup apparatus in which normal transfer of signal electric charges for a read operation and high-speed sweep transfer for a purge operation of useless electric charges are performed for a solid state image pickup device, and more particularly to an image pickup apparatus which can reduce a circuit scale.

2. Description of the Related Art

Figure 1:
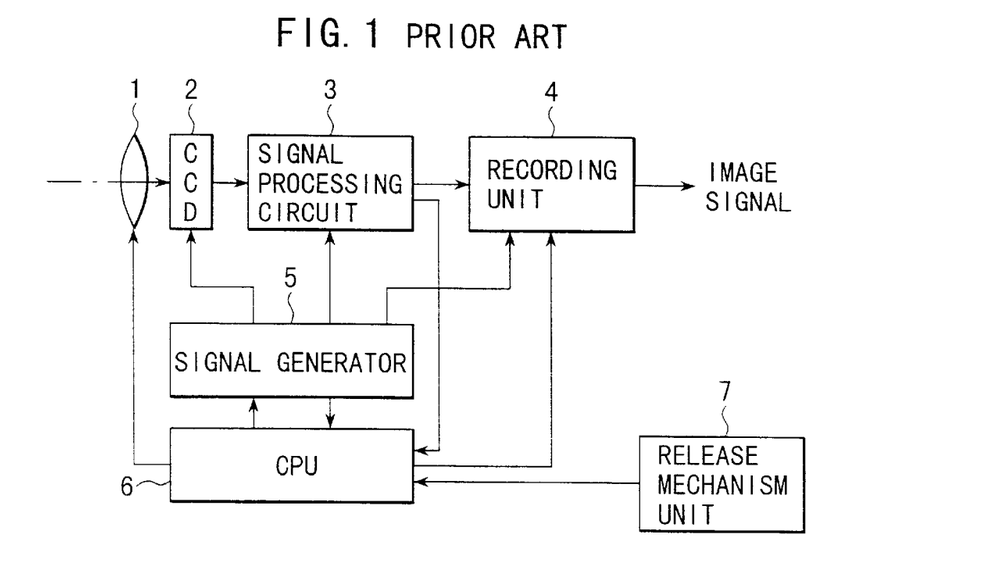
FIG. 1 is a block diagram showing a typical example of the configuration of image pickup apparatus using CCD image pickup devices.

Hitherto, there is known an image pickup apparatus which includes a CCD image pickup device designed to perform normal transfer of signal electric charges for a read operation and high-speed sweep transfer for a purge operation of useless electric charges, and which is constructed as shown in FIG. 1. The illustrated construction shows an electronic camera using a CCD image pickup device. In FIG. 1, denoted by reference numeral 1 is a lens, 2 is a CCD image pickup device, 3 is a signal processing circuit for processing an output signal of the CCD image pickup device 2 to form an image signal, 4 is a recording unit for recording the image signal from the signal processing circuit 3, 5 is a signal generator for outputting drive signals, etc. to the components, 6 is a CPU for driving and controlling the components, and 7 is a release mechanism unit (including a record trigger for starting a recording operation) which is operated by an operator (photographer) for recording.

Figure 2:
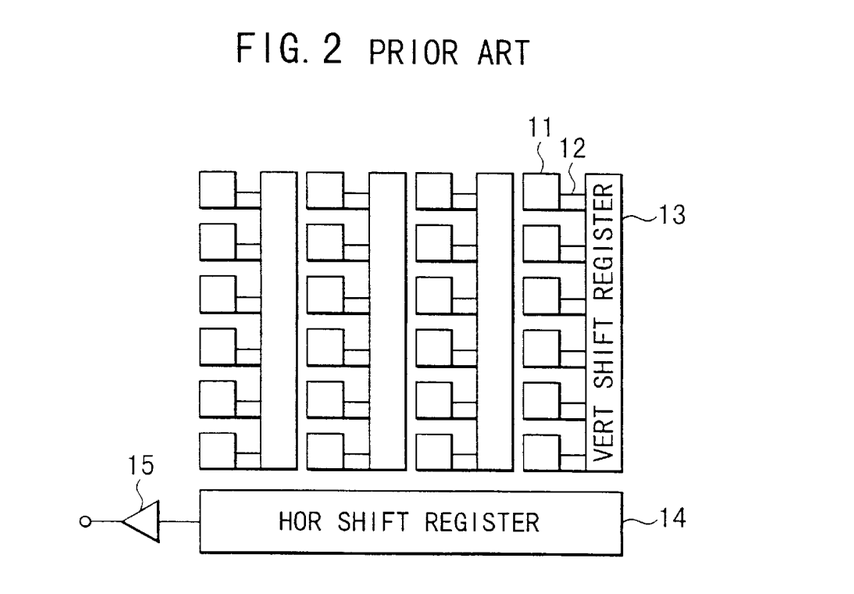
FIG. 2 is a schematic plan view showing an example of the configuration of CCD image pickup devices.

As one exemplified construction of the CCD image pickup device 2 shown in FIG. 1, FIG. 2 shows a general construction of a CCD image pickup device 2 of vertical overflow drain/interline type. In FIG. 2, denoted by 11 is a photodiode constituting each of pixels which are arrayed two-dimensionally, and 12 is a transfer gate area for transferring signal electric charges accumulated in the photodiode 11 to a vertical shift register 13. The signal electric charges transferred to the vertical shift register 13 are then transferred to a horizontal shift register 14. The signal electric charges transferred to the horizontal shift register 14 are further transferred therein and delivered to an output terminal through a signal detector 15.

Figure 3:
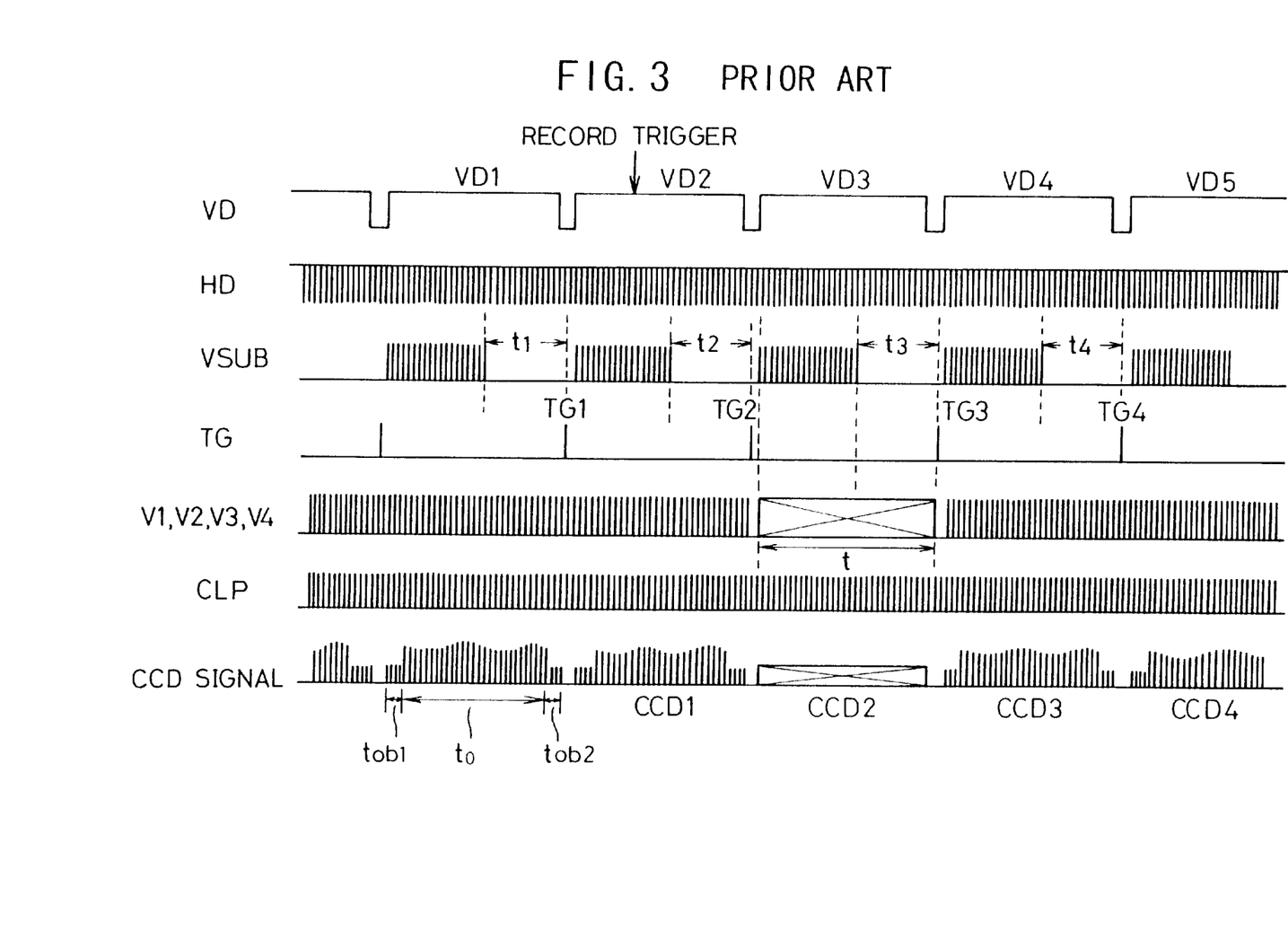
FIG. 3 is a timing chart for explaining the drive/control operation executed by a CPU in the image pickup apparatus shown in FIG. 1.

The operation of the image pickup apparatus thus constructed will now be described with reference to a timing chart shown in FIG. 3. In FIG. 3, VD represents a vertical synchronizing signal and HD represents a horizontal, synchronizing signal. Respective frame periods VD1, VD2, VD3, VD4 and VD5 are each set by the vertical synchronizing signal VD. FIG. 3 shows the case where the record trigger for starting the recording operation is output in the frame period VD2. VSUB represents a pulse for purging out signal electric charges, which are accumulated in each photodiode of the CCD image pickup device, to the substrate side, i.e., a timing pulse for determining an exposure period of the CCD image pickup device. In the timing chart of VSUB, periods $t_1$, $t_2$, $t_3$ and $t_4$ each represent the exposure period during which electric charges are generated upon light entering the photodiode of the CCD image pickup device and accumulated therein, and hence during which VSUB is not output. The signal electric charges accumulated in the photodiode are transferred to the vertical shift register by a transfer pulse TG. Transfer pulses TG1, TG2, TG3 and TG4 are output respectively for each of the frame periods VD1, VD2, VD3 and VD4. The signal electric charges transferred to the vertical shift register are then transferred successively by vertical transfer pulses V1, V2, V3 and V4 in four phases to the horizontal shift register. CLP represents a clamp pulse for stabilizing the image signal from the DC point of view. The clamp pulse CLP clamps a CCD signal output from the CCD image pickup device, thereby enabling the stable image signal to be supplied.

As shown in the timing chart of FIG. 3, when the record trigger is output during the frame period VD2 to start the recording operation, an operation of discarding the electric charges, which are accumulated due to the exposure during the exposure period $t_2$ within the frame period VD2, as useless electric charges is first carried out. This useless charge purging operation is performed in a period t corresponding to the frame period VD3 by a high-speed sweep using the vertical transfer pulses V1, V2, V3 and V4. The reason why the high-speed sweep should be effected is as follows. When making exposure within the frame period VD3, if the signal electric charges accumulated in the exposure period within the preceding frame period VD2, a phenomenon called smear occurs and a normal image cannot be obtained. Practically, in the case of photographing an object of high brightness, the signal electric charges accumulated during the frame period VD2 remain in the transfer line and are added to the signal electric charges generated due to the exposure within the frame period VD3, the resulting increased charges being output to as an CCD signal CCD3. To overcome such a problem, the above high-speed sweep operation must be performed so that the signal electric charges accumulated during the exposure period within the frame period VD2 are all discarded out of a CCD output unit.

The frame period VD3 in which the above high-speed sweep operation is performed is also an image pickup period requested by the record trigger, within which the photodiode of the CCD image pickup device is subjected to exposure during the exposure period $t_2$ and electric charges are accumulated in the photodiode. In the frame period VD4, the electric charges accumulated in the respective photodiodes are sequentially output as the CCD signal in the form of CCD3. Incidentally, the CCD signal has optical black areas $t_{ob1}$ and $t_{ob2}$ positioned at the head and tail, respectively, for determining a black level and an intermediate area $t_O$ provides an actual effective frame area.

Figure 4A:
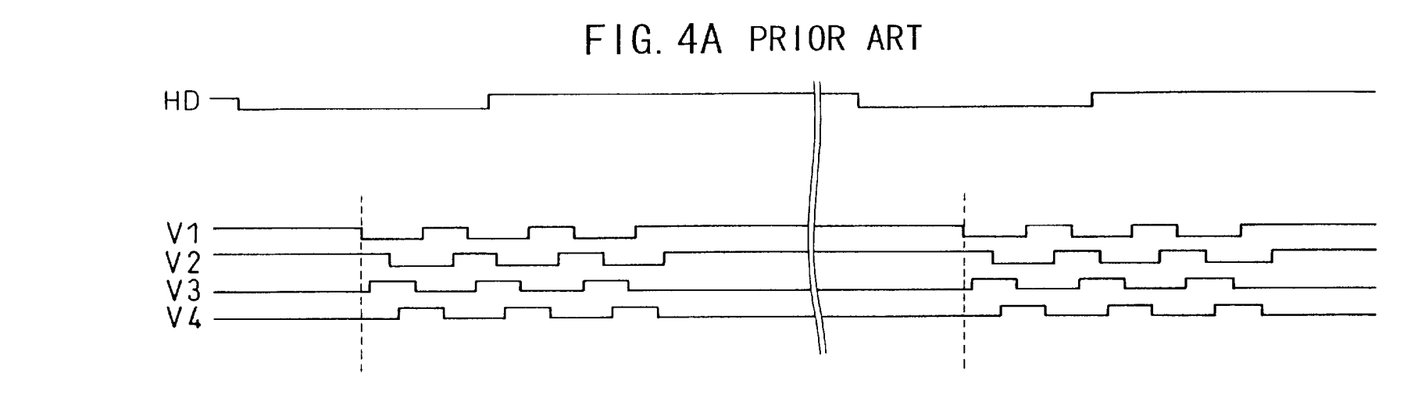
FIGS. 4A and 4B are timing charts showing how vertical transfer pulses are output to transfer signal electric charges for the normal read operation and to purge out useless electric charges for the high-speed sweep operation in a vertical shift register of the CCD image pickup device of the image pickup apparatus shown in FIG. 1.
Figure 4B:
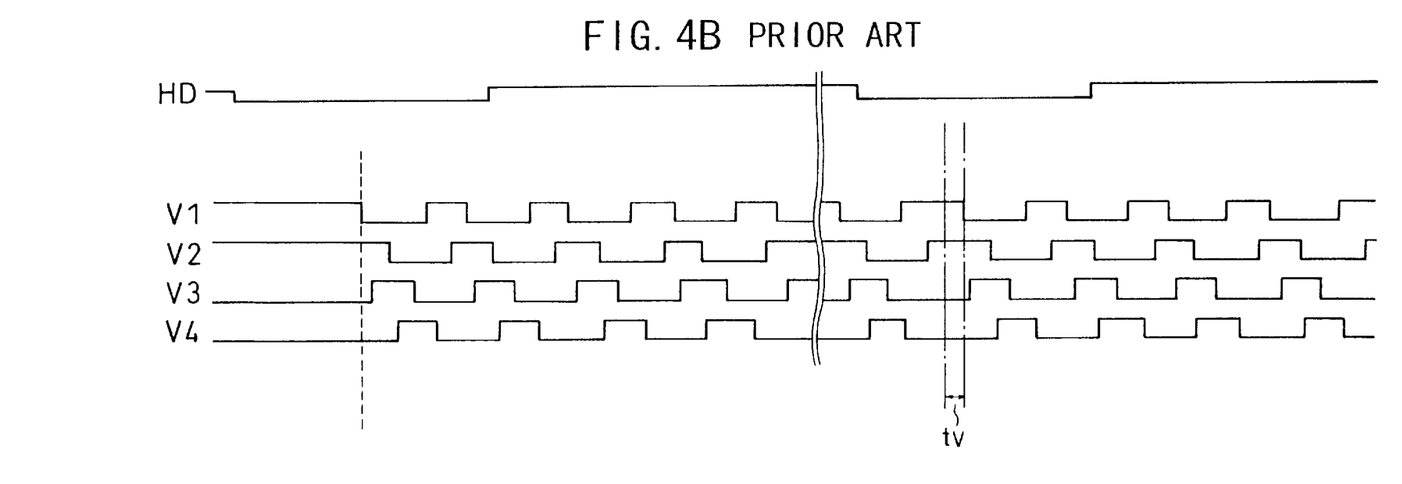

FIGS. 4A and 4B are timing charts for explaining the transfer timing for the normal read operation from the vertical shift register and the high-speed purging operation for purging out the useless electric charges transferred to the vertical shift register, respectively, in the above-described conventional image pickup apparatus. As shown in FIG. 4A, the transfer timing for the normal read operation is set by generating the vertical transfer pulses V1, V2, V3 and V4 in synchronism with the horizontal synch signal HD. On the other hand, FIG. 4B shows the timing at which the vertical transfer pulses are generated for purging out the useless electric charges at a high speed. In the high-speed sweep operation, the vertical transfer pulses are generated successively, as shown, so that the electric charges are swept away. Thus, the transfer operation for normal reading of the accumulated electric charges and the transfer operation for purging out the useless electric charges are different from each other in nature. In the conventional image pickup apparatus, therefore, transfer pulses are formed by separate circuits and supplied to the vertical shift register of the CCD image pickup device in a switching manner between the two transfer operations. However, forming the vertical transfer pulses for the normal read operation and the high-speed sweep operation by separate circuits raises the problem of increasing a circuit scale.

Also, when the vertical transfer pulses are generated at a certain pulse cycle successively for the high-speed sweep operation, there may occur a mismatch in timed relation between the vertical transfer pulses and the horizontal synchronizing signal HD within one horizontal period, as shown in FIG. 4B; hence a vertical transfer stop period $t_v$ may occur. This raises the problem that the timing of the vertical transfer pulses cannot be managed within each horizontal period and a circuit scale is necessarily increased because of a difficulty in timing control.

Further, in the conventional image pickup apparatus, the operation for sweeping away the useless electric charges is performed in units of one vertical period. Such a conventional scheme of performing the high-speed sweep operation in units of one vertical period, however, prolongs the sweep period and increases the number of times of the vertical transfer pulses V1–V4 being applied at a full level. Thus, there arises another problem that an amount of electric power consumed is increased correspondingly.

Additionally, in the conventional image pickup apparatus, the clamp pulse CLP is output to clamp the CCD signal continuously including the period of high-speed sweep operation, as shown in the timing chart of FIG. 3. This raises the problem that the swept signal electric charges are mixed in the optical black areas of the output CCD signal and a stable image cannot be obtained.

SUMMARY OF THE INVENTION

The present invention has been made with a view of solving the above-mentioned problems in the conventional image pickup apparatus, and a main object of the present invention is to provide an image pickup apparatus in which a circuit for generating vertical transfer pulses (control pulses) for the normal read operation and a circuit for generating vertical transfer pulses (control pulses) for the high-speed sweep operation are used in common and hence a circuit scale is reduced.

According to the present invention, in an image pickup apparatus comprising a solid state image pickup device made up of a plurality of photoelectric transducers which are two-dimensionally arrayed in the horizontal and vertical directions, a vertical shift register for receiving signal electric charges of each photoelectric transducer and transferring the signal electric charges in the vertical direction, and a horizontal shift register for transferring the signal electric charges in the vertical shift register in the horizontal direction, and control means for driving and controlling the solid state image pickup device, the control means has a driving function in a mode for sequentially transferring the signal electric charges, which have been transferred from the photoelectric transducer of the solid state image pickup device to the vertical shift register, to the horizontal shift register in synchronism with a transfer operation of the horizontal shift register, and a driving function in a mode for continuously transferring the signal electric charges, which have been transferred from the photoelectric transducer of the solid state image pickup device to the vertical shift register, to the horizontal shift register, the control means applying control pulses for driving the vertical shift register to the solid state image pickup device, the timing of the control pulses being set to be substantially the same in the two modes.

By setting the timing of control pulses (vertical transfer pulses) for driving the vertical shift register to be substantially the same in both a normal signal-charge read mode for sequentially transferring the signal electric charges, which have been transferred to the vertical shift register, to the horizontal shift register in synchronism with a transfer operation of the horizontal shift register, and a high-speed sweep mode for continuously transferring the signal electric charges, which have been transferred to the vertical shift register, to the horizontal shift register, there can be provided an image pickup apparatus in which the control pulses for use in both the modes can be formed by a common circuit and the circuit configuration can be simplified.

Another object of the present invention is to provide an image pickup apparatus which can manage the timing of the vertical transfer pulses just within one horizontal period, can make the timing control easy, and can reduce a circuit scale.

According to the present invention, in an image pickup apparatus comprising a solid state image pickup device made up of a plurality of photoelectric transducers which are two-dimensionally arrayed in the horizontal and vertical directions, a vertical shift register for receiving signal electric charges of each photoelectric transducer and transferring the signal electric charges in the vertical direction, and a horizontal shift register for transferring the signal electric charges in the vertical shift register in the horizontal direction, and control means for driving and controlling the solid state image pickup device, the control means has a driving function in a mode for sequentially transferring the signal electric charges, which have been transferred from the photoelectric transducer of the solid state image pickup device to the vertical shift register, to the horizontal shift register in synchronism with a transfer operation of the horizontal shift register, and a driving function in a mode for continuously transferring the signal electric charges, which have been transferred from the photoelectric transducer of the solid state image pickup device to the vertical shift register, to the horizontal shift register, the control means applying control pulses for driving the vertical shift register to the solid state image pickup device, and a pulse cycle W of the control pulses applied in the mode for continuously transferring the signal electric charges, which have been transferred to the vertical shift register, to the horizontal shift register is set to meet the relationship of 1H=W×n (n is one or more integer) for one horizontal period (1H) in the mode for sequentially transferring the signal electric charges, which have been transferred to the vertical shift register, to the horizontal shift register in synchronism with the transfer operation of the horizontal shift register.

By setting the pulse cycle W of the control pulses (vertical transfer pulses) for driving the vertical shift register, which are applied in a high-speed sweep mode for continuously transferring the signal electric charges, which have been transferred to the vertical shift register, to the horizontal shift register, so as to meet the above relationship, it is possible to avoid a mismatch between the control pulses and a horizontal synchronizing signal HD within one horizontal period. There can be thus provided an image pickup apparatus in which the timing of the control pulses can be managed just within one horizontal period, the timing control can be made easy, and the circuit scale can be reduced.

Still another object of the present invention is to provide an image pickup apparatus which can shorten a period of the high-speed sweep operation and can suppress an amount of electric power consumed.

According to the present invention, in an image pickup apparatus comprising a solid state image pickup device made up of a plurality of photoelectric transducers which are two-dimensionally arrayed in the horizontal and vertical directions, a vertical shift register for receiving signal electric charges of each photoelectric transducer and transferring the signal electric charges in the vertical direction, and a horizontal shift register for transferring the signal electric charges in the vertical shift register in the horizontal direction, and control means for driving and controlling the solid state image pickup device, the control means has a driving function in a mode for sequentially transferring the signal electric charges, which have been transferred from the photoelectric transducer of the solid state image pickup device to the vertical shift register, to the horizontal shift register in synchronism with a transfer operation of the horizontal shift register, a driving function in a mode for continuously transferring the signal electric charges, which have been transferred from the photoelectric transducer of the solid state image pickup device to the vertical shift register, to the horizontal shift register, and an electronic shutter function of extracting accumulated signal electric charges from the photoelectric transducer of the solid state image pickup device to control a photoelectric conversion time, and in an operation using the electronic shutter function, transfer of electric charges in the mode for continuously transferring the signal electric charges, which have been transferred to the vertical shift register, to the horizontal shift register is performed in the number of times corresponding to the sum of the number of all register units constituting the vertical shift registers and m (m is one or more integer) until the end of the photoelectric conversion time, thereby purging out useless electric charges in the vertical shift registers.

By performing transfer of electric charges in a high-speed sweep mode for continuously transferring the signal electric charges, which have been transferred to the vertical shift register, to the horizontal shift register in the number of times, mentioned above, for thereby purging out useless electric charges, the high-speed sweep operation can be avoided from being repeated in the number of times larger than required, and the period of the high-speed sweep operation can be cut down. There can be thus provided an image pickup apparatus in which the amount of electric power consumed can be reduced.

Still another object of the present invention is to provide an image pickup apparatus which can suppress variations of an image signal during the period of the high-speed sweep operation.

According to the present invention, in an image pickup apparatus comprising a solid state image pickup device made up of a plurality of photoelectric transducers which are two-dimensionally arrayed in the horizontal and vertical directions, a vertical shift register for receiving signal electric charges of each photoelectric transducer and transferring the signal electric charges in the vertical direction, and a horizontal shift register for transferring the signal electric charges in the vertical shift register in the horizontal direction, clamp means for clamping an optical black level of the solid state image pickup device, and control means for driving and controlling the solid state image pickup device and for controlling the clamp means, the control means has a driving function in a mode for sequentially transferring the signal electric charges, which have been transferred from the photoelectric transducer of the solid state image pickup device to the vertical shift register, to the horizontal shift register in synchronism with a transfer operation of the horizontal shift register, and a driving function in a mode for continuously transferring the signal electric charges, which have been transferred from the photoelectric transducer of the solid state image pickup device to the vertical shift register, to the horizontal shift register, and when transfer of electric charges in the mode for continuously transferring the signal electric charges, which have been transferred to the vertical shift register, to the horizontal shift register is performed in the number of times corresponding to at least the number of all register units constituting the vertical shift registers thereby purging out useless electric charges in the vertical shift registers, clamp pulses supplied from the control means to the clamp means are stopped for a period from the time to start purging out the useless electric charges until the transfer of electric charges is ended after being repeated in the number of times corresponding to the sum of the number of all register units constituting the vertical shift registers and m (m is one or more integer).

By stopping the clamp pulses for the period, mentioned above, when transfer of electric charges in a high-speed sweep mode for continuously transferring the signal electric charges, which have been transferred to the vertical shift register, to the horizontal shift register is performed in the number of times corresponding to at least the number of all register units constituting the vertical shift registers thereby purging out useless electric charges in the vertical shift registers, a CCD signal is not clamped during the period of the high-speed sweep operation, and the useless electric charges purged out by the high-speed sweep operation are prevented from being mixed in optical black areas of the output CCD signal. There can be thus provided an image pickup apparatus in which a stable image signal can be supplied to form a next recording image.

Still another object of the present invention is to provide an image pickup apparatus which can always supply a stable image signal level.

According to the present invention, in an image pickup apparatus comprising a solid state image pickup device made up of a plurality of photoelectric transducers which are two-dimensionally arrayed in the horizontal and vertical directions, a vertical shift register for receiving signal electric charges of each photoelectric transducer and transferring the signal electric charges in the vertical direction, and a horizontal shift register for transferring the signal electric charges in the vertical shift register in the horizontal direction, clamp means for clamping an optical black level of the solid state image pickup device, and control means for driving and controlling the solid state image pickup device and for controlling the clamp means, the control means has a driving function in a mode for sequentially transferring the signal electric charges, which have been transferred from the photoelectric transducer of the solid state image pickup device to the vertical shift register, to the horizontal shift register in synchronism with a transfer operation of the horizontal shift register, and a driving function in a mode for continuously transferring the signal electric charges, which have been transferred from the photoelectric transducer of the solid state image pickup device to the vertical shift register, to the horizontal shift register, and when transfer of electric charges in the mode for continuously transferring the signal electric charges, which have been transferred to the vertical shift register, to the horizontal shift register is performed in the number of times equal to or less than the number of all register units constituting the vertical shift registers thereby purging out useless electric charges in the vertical shift registers, clamp pulses supplied from the control means to the clamp means are stopped for a period given by both the period of purging out the useless electric charge and a number m (m is one or more integer) of horizontal periods after the purge of the useless electric charges.

By stopping the clamp pulses as mentioned above, when an image signal of only necessary lines is to be obtained by performing transfer of electric charges in a high-speed sweep mode for continuously transferring the signal electric charges, which have been transferred to the vertical shift register, to the horizontal shift register in the number, of times equal to or less than the number of all register units constituting the vertical shift registers, the CCD signal can be avoided from being clamped in unstable periods therein. There can be thus provided an image pickup apparatus in which a stable image signal level can be always supplied.

DESCRIPTION OF THE PREFERRED EMBODIMENTS

Preferred embodiments of the present invention will be described below. The basic configuration of an image pickup apparatus, to which the present invention is applied, is the same as that of the conventional image pickup apparatus shown in FIG. 1 except the control operation executed by a CPU serving as drive/control means, and therefore the description thereof is omitted here. A first embodiment of the drive/control operation executed by the CPU in the image pickup apparatus according to the present invention will be described below with reference to timing charts of FIGS. 5A and 5B. This first embodiment corresponds to a first aspect of the present invention.

Figure 5A:
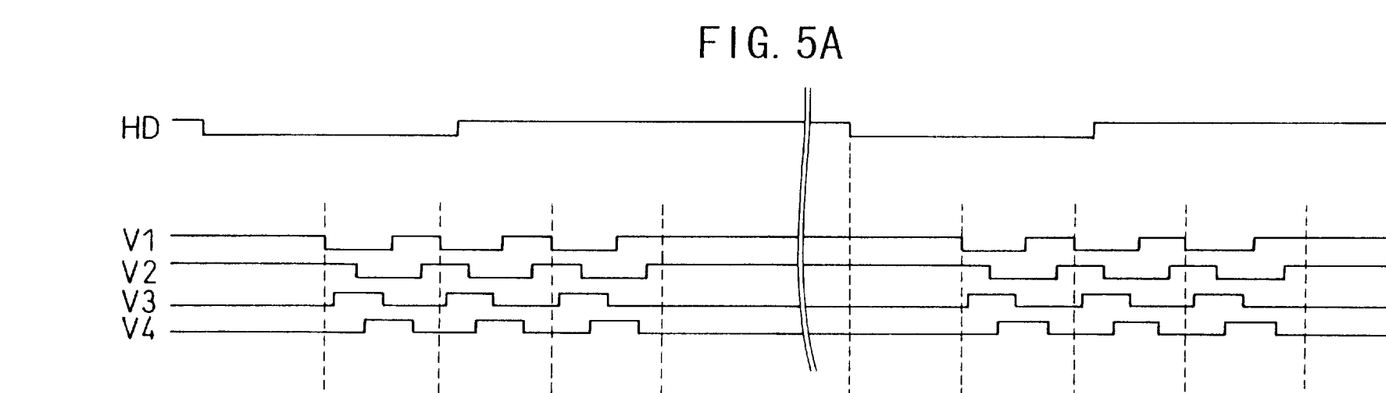
FIGS. 5A and 5B are timing charts showing how vertical transfer pulses are output to transfer signal electric charges for the normal read operation and to purge out useless electric charges for the high-speed sweep operation in a vertical shift register according to a first embodiment of the present invention.
Figure 5B:
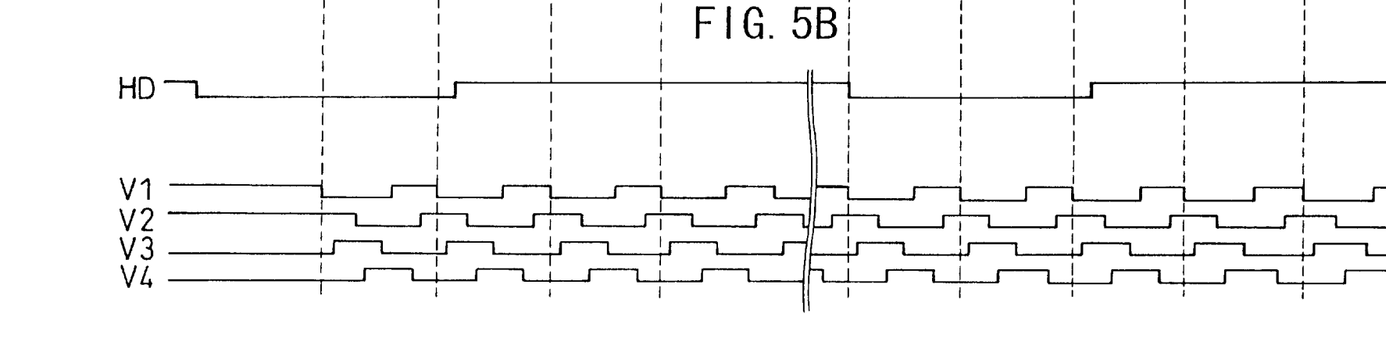

As mentioned above, because the operation for transferring electric charges in a normal read mode and the operation for purging out useless electric charges in a high-speed sweep mode are different from each other in nature, it has been general in the conventional CCD image pickup device to use vertical transfer pulses, which are formed by separate circuits, for driving and controlling the vertical shift register. Such a scheme however has the problem of increasing a circuit scale. To avoid the problem, in this first embodiment, the timing, i.e., the pulse width and cycle, of vertical transfer pulses V1, V2, V3 and V4 used for transferring signal electric charges to perform the normal read operation, shown in FIG. 5A, are set to be the same as the timing, i.e., the pulse width and cycle, of vertical transfer pulses V1, V2, V3 and V4 used for purging out useless signal electric charges to perform the high-speed sweep operation, shown in FIG. 5B. Thus, in the high-speed sweep mode shown in FIG. 5B, the vertical transfer pulses having the same pulse width and cycle as those of the vertical transfer pulses used for transferring signal electric charges in the normal read mode are generated repetitively to carry out a process of sweeping away the useless signal electric charges.

By setting the pulse width and cycle of the vertical transfer pulses to be the same in the normal read operation for transferring the signal electric charges and the high-speed sweep operation for purging out the useless signal electric charges, the vertical transfer pulses can be generated by a common counter circuit. As a result, the circuit configuration can be simplified and the circuit scale can be reduced.

A second embodiment of the drive/control operation will be described below. This second embodiment corresponds to a second aspect of the present invention. In the conventional image pickup apparatus, as shown in FIGS. 4A and 4B, when the vertical transfer pulses of a certain pulse cycle are used to purge out the useless electric charges in the high-speed sweep operation, there may occur a mismatch in timed relation between the vertical transfer pulses and the horizontal synchronizing signal HD within one horizontal period. If such a mismatch occurs, the timing of the vertical transfer pulses cannot be managed within one horizontal period.

Figure 6:
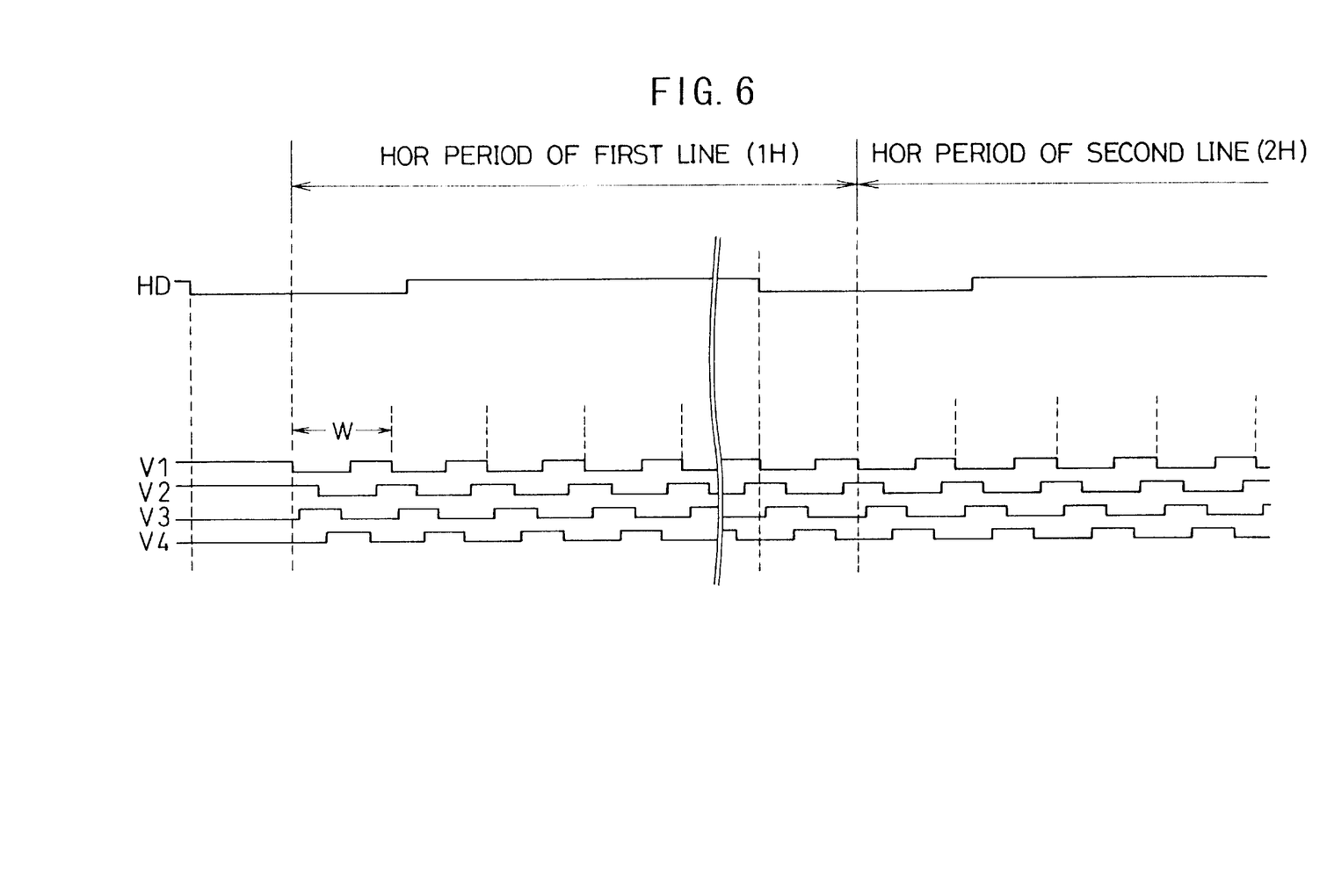
FIG. 6 is a timing chart showing how vertical transfer pulses are output for the high-speed sweep operation in the vertical shift register according to a second embodiment of the present invention.

To overcome the above problem, in this second embodiment, the pulse cycle (interval) of the vertical transfer pulses V1, V2, V3 and V4 used for the high-speed sweep operation is set to a value adjustable within the period of one horizontal line, as shown in a timing chart of FIG. 6, so that the timing of the vertical transfer pulses can be managed separately between the period of a first horizontal line (1H) and the period of a second horizontal line (2H). In other words, assuming that the pulse cycle of the vertical transfer pulses is W, the pulse cycle W is set to meet the relationship of 1H=W×n (n is one or more integer) for one horizontal period (1H) in the normal read mode for transferring the electric charges.

By so setting the pulse cycle of the vertical transfer pulses V1, V2, V3 and V4, the vertical transfer pulse V1 falls at the beginning of the first horizontal line and then repeats rising and falling many times. The other vertical transfer pulses V2, V3 and V4 in different phases also repeat rising and falling many times similarly to the vertical transfer pulse V1. After that, the vertical transfer pulse V1 falls in match with the end of the first horizontal line. Accordingly, since the timing of the vertical transfer pulses can be managed within one horizontal period, the timing control can be simplified and the circuit scale can be reduced. Further, by managing the timing of the vertical transfer pulses within each horizontal period, it is possible to construct the vertical transfer pulses just by setting the timing of the vertical transfer pulses in one horizontal period. Also, in trying to change the number of times of purging out the useless electric charges, such a change can be very easily controlled because the number of sweep times can be set within one horizontal period.

Figure 7:
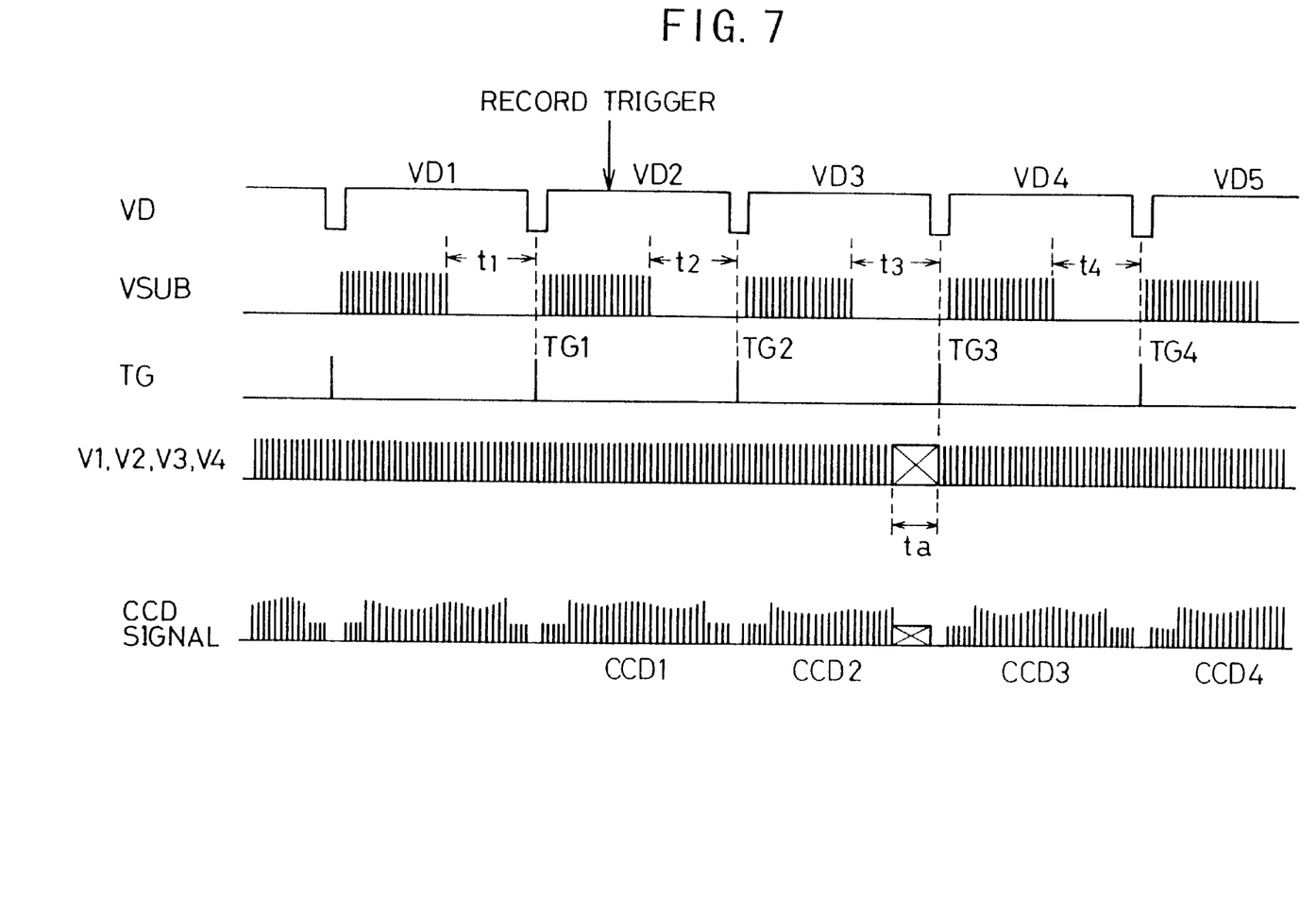
FIG. 7 is a timing chart for explaining the drive/control operation executed by a CPU according to a third embodiment of the present invention.

A third embodiment of the drive/control operation will be described below. This third embodiment corresponds to a third aspect of the present invention. In the conventional image pickup apparatus, as shown in FIG. 3, the high-speed sweep operation for purging out the useless electric charges is performed in units of one vertical period. This scheme prolongs the sweep period and increases the number of times of the vertical transfer pulses V1–V4 being applied at a full level, resulting in an increased amount of electric power consumed. To avoid such a problem, in this third embodiment, the high-speed sweep transfer is performed in the number of times corresponding to the sum of the number of all register units constituting the vertical shift registers and m (m is one or more integer) until the end of the exposure period, as shown in FIG. 7, for thereby purging out the useless electric charges. In FIG. 7, $t_a$ is a high-speed sweep period.

Theoretically, the high-speed sweep transfer for purging out the useless electric charges is required to be performed just in the number of times corresponding to the number of all register units constituting the vertical shift registers, which in turn corresponds to the number of pixels in the vertical direction, in order to purge out the useless electric charges. In practice, however, at the stage of shift from vertical transfer to horizontal transfer, useless electric charges remain in the vertical shift registers and are added to a next recording image to be then output as the CCD signal. By performing the high-speed sweep transfer more m times additionally, i.e., by performing the high-speed sweep transfer in the required and sufficient number of times, the useless electric charges remaining at the stage of shift from vertical transfer to horizontal transfer can be completely purged out. Thus, since the high-speed sweep operation is performed just in the required and sufficient number of times, the high-speed sweep period can be shortened and the amount of electric power consumed can be suppressed.

A fourth embodiment of the drive/control operation will be described below. This fourth embodiment corresponds to a fourth aspect of the present invention. In the conventional image pickup apparatus, as shown in FIG. 3, the clamp pulse CLP is output to clamp the CCD signal continuously including the period of high-speed sweep operation for purging out useless electric charges. There is hence a problem that the purged signal electric charges are mixed in the optical black areas of the output CCD signal and a stable image cannot be obtained. To avoid the problem, in this fourth embodiment, the clamp pulse CLP is stopped from being output for a period of time $t_{CLP}$ within the high-speed sweep period, as shown in a timing chart of FIG. 8, so that variations of the image signal otherwise occurred during the high-speed sweep operation can be suppressed.

Figure 8:
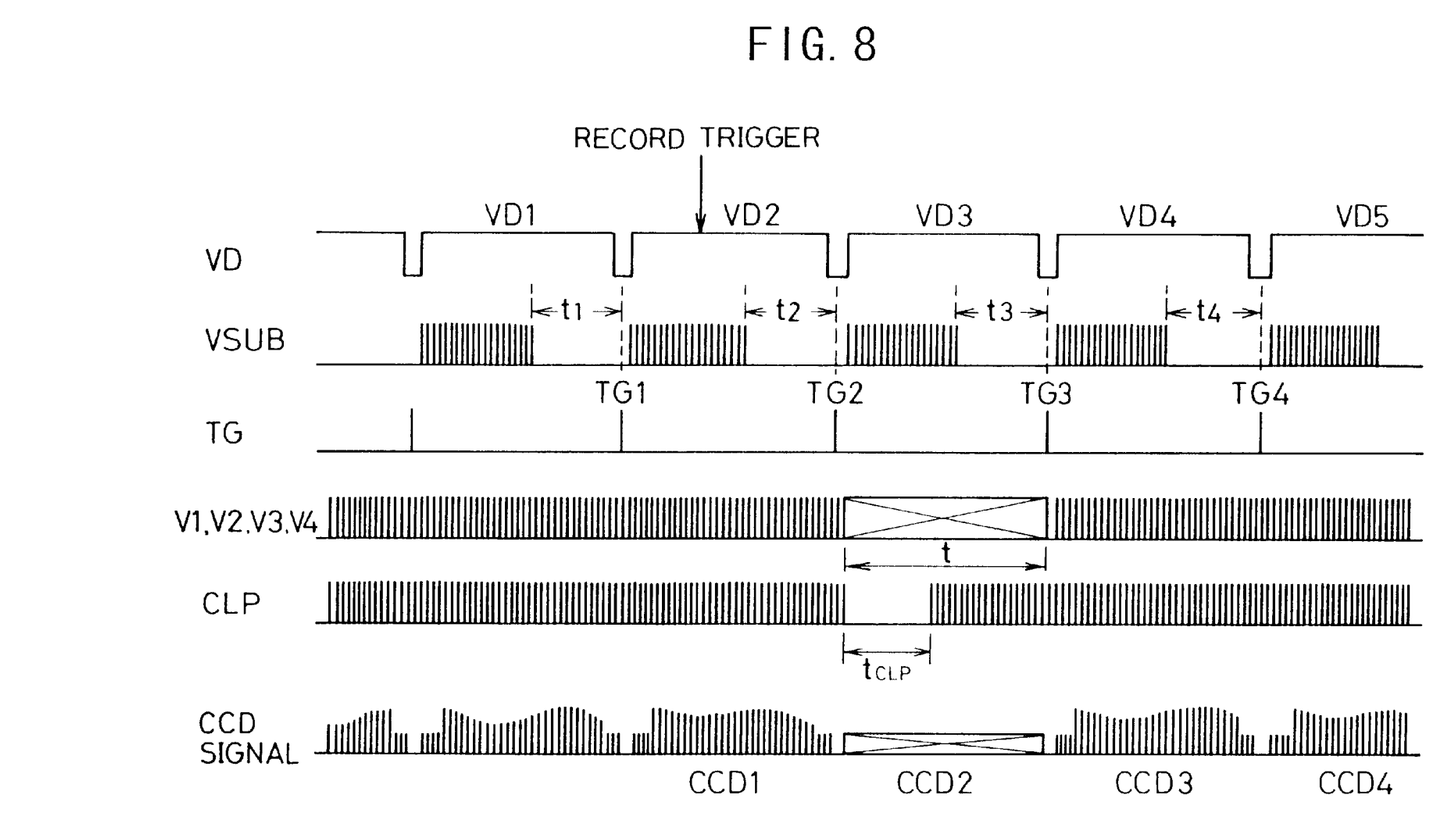
FIG. 8 is a timing chart for explaining the drive/control operation executed by the CPU according to a fourth embodiment of the present invention.

The clamp pulse stop period $t_{CLP}$ is a period from the time to start purging out the useless electric charges to the time at which the high-speed sweep transfer is ended after being repeated in the number of times corresponding to the sum of the number of all register units constituting the vertical shift registers and m (m is one or more integer). The length of the clamp pulse stop period $t_{CLP}$ corresponds in itself to the high-speed sweep period $t_a$ enough to completely purge out the useless electric charges in the above third embodiment.

By so setting the output stop period for the clamp pulse CLP, since the useless electric charges are not clamped in part of the high-speed sweep period, and therefore a stable image signal can be supplied for the next recording image.

A fifth embodiment of the drive/control operation will be described below. This fifth embodiment corresponds to a fifth aspect of the present invention.

Generally, in image pickup apparatus, it is often desired to form a recording image by discarding signal electric charges of unnecessary lines on one frame and taking out signal electric charges of necessary lines on it.

Figure 9:
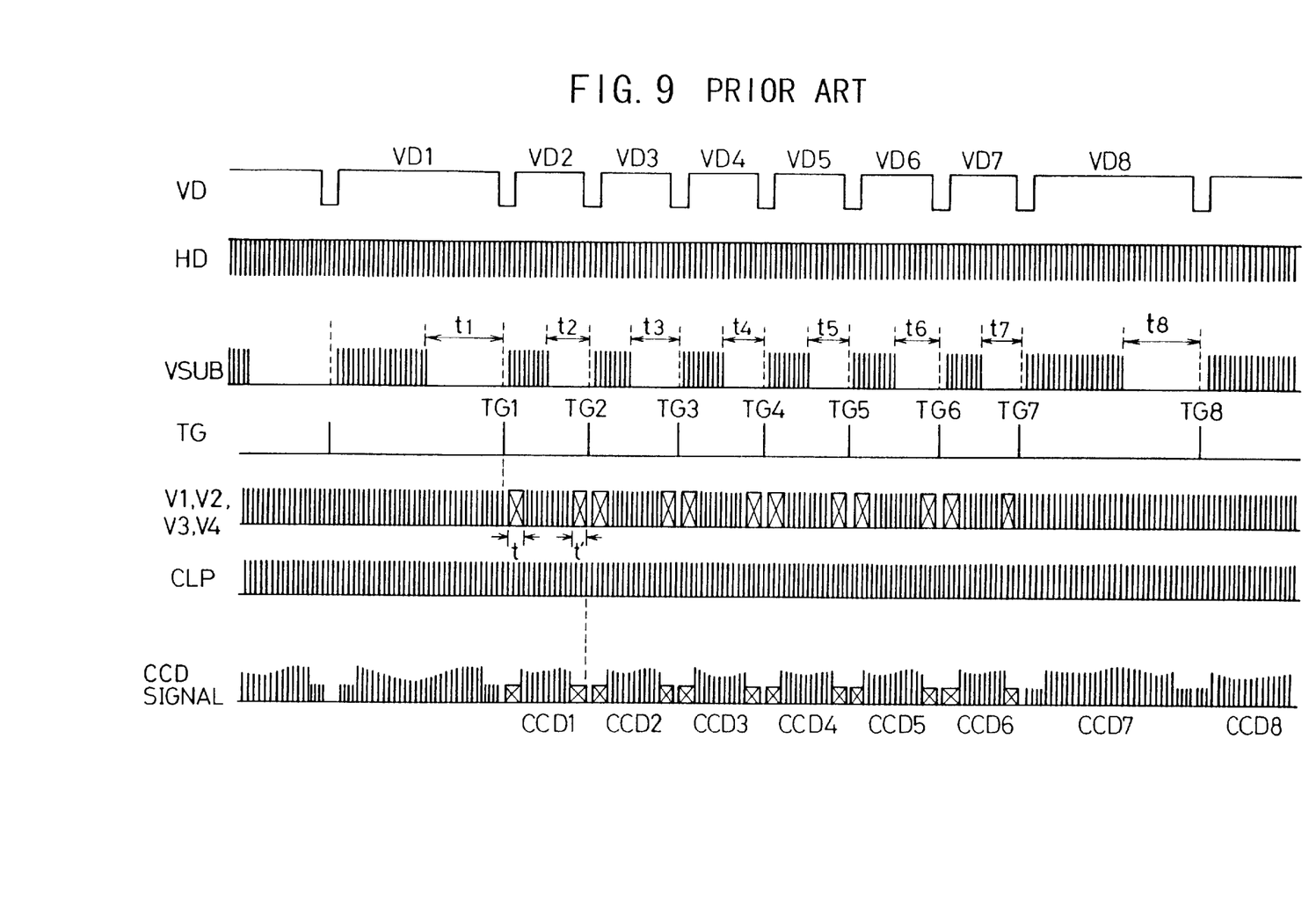
FIG. 9 is a timing chart for explaining the drive/control operation executed in the conventional image pickup apparatus when an image signal is obtained by taking out partial necessary lines on one frame.

The operation of picking up an image in such a manner will be described with reference to a timing chart of FIG. 9. FIG. 9 shows the case where, in images of frame periods VD2–VD7, lines at the head and tail of each frame period are discarded as the unnecessary. Periods of time t and t' within the output periods of the vertical transfer pulses V1–V4 represent the high-speed sweep periods in which the signal electric charges of the unnecessary lines are discarded by the high-speed sweep operation. In the remaining intermediate period other than the high-speed sweep periods t and t', the normal read operation of accumulated electric charges is performed to successively output the CCD signals CCD1–CCD6 as image signals constituted by only the necessary lines except the unnecessary lines.

In such a case of obtaining an image signal of only the necessary lines by removing the signal electric charges of the unnecessary lines, as useless electric charges, through the high-speed sweep operation, however, the clamp pulse CLP is output to clamp the CCD signal continuously including the high-speed sweep periods t and t'. There is hence a problem that an image signal having stable optical black level cannot be obtained as the output CCD signal.

Figure 10:
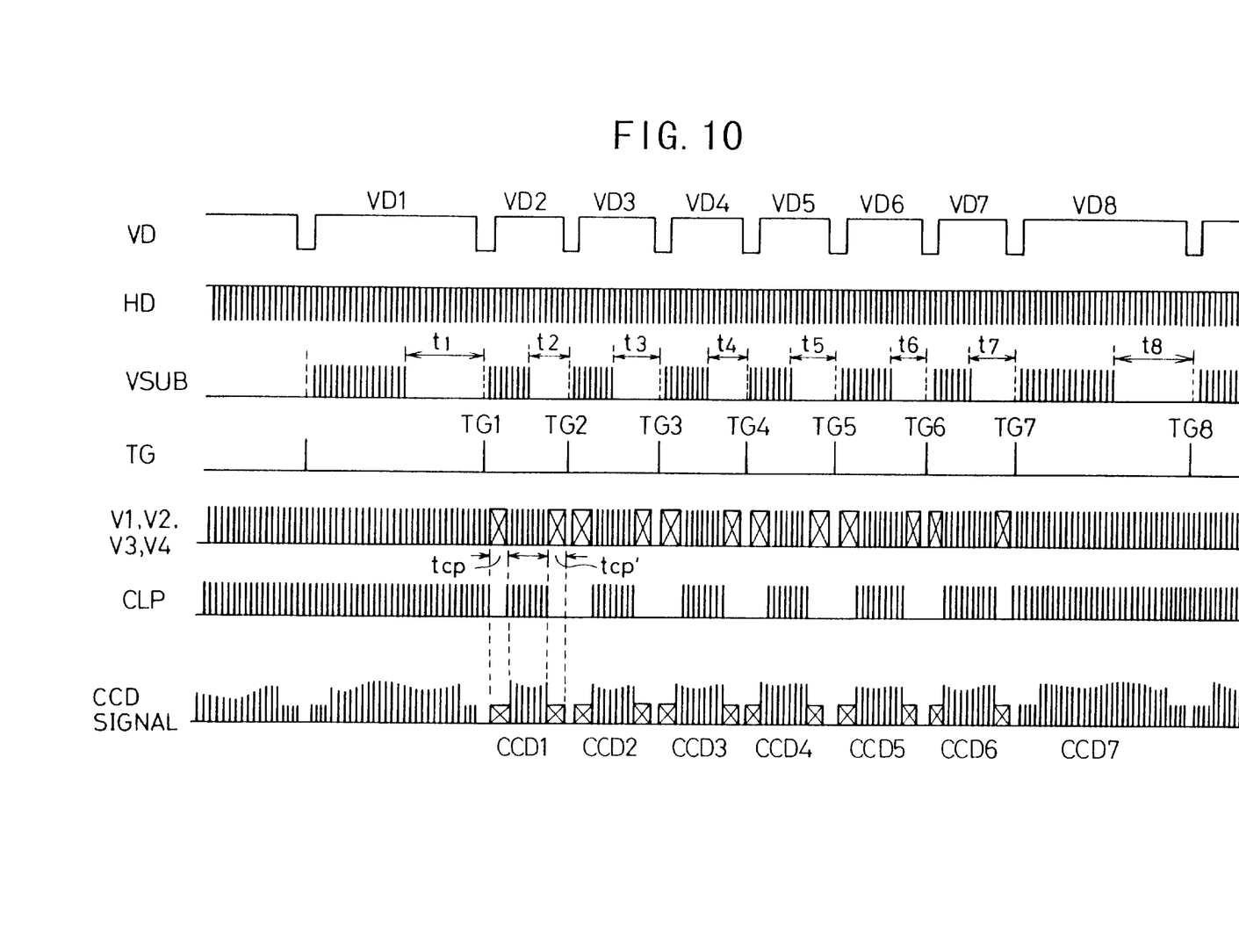
FIG. 10 is a timing chart for explaining the drive/control operation executed by the CPU according to a fifth embodiment of the present invention.

This fourth embodiment has been made to overcome the above problem. As shown in FIG. 10, the clamp pulse CLP is stopped from being output to interrupt the clamp operation for periods $t_{CP}$ and $t_{CP}$ which correspond to the high-speed sweep periods t and t' for purging out the useless electric charges by the vertical transfer pulses V1–V4. Precisely, the stop periods $t_{CP}$ and $t_{CP}$ are each given by both the period of purging out the useless electric charge in the high-speed sweep mode and a number m (m is one or more integer) of horizontal periods after the purge of the useless electric charges.

By so stopping the clamp operation during the high-speed sweep period, an optical black level of each of the CCD signals CCD1–CCD6 can be avoided from being clamped in unstable periods therein. As a result, a stable image signal level can be always supplied.

As, described above in connection with the preferred embodiments, the present invention can provide the advantages below. According to the first aspect of the present invention, since the pulse width and cycle of control pulses for driving the vertical shift register are set to be substantially the same in both the normal read mode for reading signal electric charges and the high-speed sweep mode for purging out useless signal electric charges, the control pulses for use in both the modes can be formed by a common circuit and hence the circuit configuration can be simplified. According to the second aspect of the present invention, since the pulse cycle W of the control pulses for driving the vertical shift register in the high-speed sweep mode is set to 1/n (n is one or more integer) of one horizontal period, the timing of the control pulses can be managed just within one horizontal period, the timing control can be made easy, and the circuit scale can be reduced. According to the third aspect of the present invention, since transfer of electric charges in the high-speed sweep mode is performed in the number of times corresponding to the sum of the number of all register units constituting the vertical shift registers and m (m is one or more integer) until the end of the photoelectric conversion time, the high-speed sweep operation can be avoided from being repeated in the number of times larger than required, whereby the period of the high-speed sweep operation can be cut down and the amount of electric power consumed can be reduced.

According to the fourth aspect of the present invention, when purging out useless electric charges in the vertical shift registers, the clamp pulses are stopped for a period from the time to start purging out the useless electric charges until the high-speed sweep transfer of electric charges is ended after being repeated in the number of times corresponding to the sum of the number of all register units constituting the vertical shift registers and m (m is one or more integer). Therefore, the useless electric charges purged out by the high-speed sweep operation are prevented from being mixed in optical black areas of the output signal, and a stable image signal can be supplied to form a next recording image. According to the fifth aspect of the present invention, the transfer of useless electric charges is performed in the number of times equal to or less than the number of all register units constituting the vertical shift registers thereby purging, and the clamp pulses are stopped for a period given by both the period of purging out the useless electric charge and a number m (m is one or more integer) of horizontal periods after the purge of the useless electric charges. Therefore, even when an image signal of only necessary lines is to be obtained by performing the transfer of useless electric charges to the horizontal shift register in the number of times equal to or less than the number of all register units constituting the vertical shift registers, a stable image signal level can be always supplied.

What is claimed is:

1. An image pickup apparatus comprising a solid state image pickup device made up of a plurality of photoelectric transducers which are two-dimensionally arrayed in the horizontal and vertical directions, a vertical shift register for receiving signal electric charges of each photoelectric transducer and transferring the signal electric charges in the vertical direction, and a horizontal shift register for transferring the signal electric charges in said vertical shift register in the horizontal direction, and control means for driving and controlling said solid state image pickup device, wherein said control means has a driving function in a mode for sequentially transferring the signal electric charges, which have been transferred from said photoelectric transducer of said solid state image pickup device to said vertical shift register, to said horizontal shift register in synchronism with a transfer operation of said horizontal shift register, and a driving function in a mode for continuously transferring the signal electric charges, which have been transferred from said photoelectric transducer of said solid state image pickup device to said vertical shift register, to said horizontal shift register, said control means applying control pulses for driving said vertical shift register of said solid state image pickup device, the timing of said control pulses being set to be substantially the same in said two modes.

2. An image pickup apparatus comprising a solid state image pickup device made up of a plurality of photoelectric transducers which are two-dimensionally arrayed in the horizontal and vertical directions, a vertical shift register for receiving signal electric charges of each photoelectric transducer and transferring the signal electric charges in the vertical direction, and a horizontal shift register for transferring the signal electric charges in said vertical shift register in the horizontal direction, and control means for driving and controlling said solid state image pickup device, wherein said control means has a driving function in a mode for sequentially transferring the signal electric charges, which have been transferred from said photoelectric transducer of said solid state image pickup device to said vertical shift register, to said horizontal shift register in synchronism with a transfer operation of said horizontal shift register, and a driving function in a mode for continuously transferring the signal electric charges, which have been transferred from said photoelectric transducer of said solid state image pickup device to said vertical shift register, to said horizontal shift register, said control means applying control pulses for driving said vertical shift register of said solid state image pickup device, and a pulse cycle W of said control pulses applied in the mode for continuously transferring the signal electric charges, which have been transferred to said vertical shift register, to said horizontal shift register is set to meet the relationship of 1H=W×n (n is one or more integer) for one horizontal period (1H) in the mode for sequentially transferring the signal electric charges, which have been transferred to said vertical shift register, to said horizontal shift register in synchronism with the transfer operation of said horizontal shift register.

3. An image pickup apparatus comprising a solid state image pickup device made up of a plurality of photoelectric transducers which are two-dimensionally arrayed in the horizontal and vertical directions, a vertical shift register for receiving signal electric charges of each photoelectric transducer and transferring the signal electric charges in the vertical direction, and a horizontal shift register for transferring the signal electric charges in said vertical shift register in the horizontal direction, and control means for driving and controlling said solid state image pickup device, wherein said control means has a driving function in a mode for sequentially transferring the signal electric charges, which have been transferred from said photoelectric transducer of said solid state image pickup device to said vertical shift register, to said horizontal shift register in synchronism with a transfer operation of said horizontal shift register, a driving function in a mode for continuously transferring the signal electric charges, which have been transferred from said photoelectric transducer of said solid state image pickup device to said vertical shift register, to said horizontal shift register, and an electronic shutter function of extracting accumulated signal electric charges from said photoelectric transducer of said solid state image pickup device to control a photoelectric conversion time, and in an operation using the electronic shutter function, transfer of electric charges in the mode for continuously transferring the signal electric charges, which have been transferred to said vertical shift register, to said horizontal shift register is performed in the number of times corresponding to the sum of the number of all register units constituting said vertical shift register and m (m is one or more integer) until the end of the photoelectric conversion time, thereby purging out useless electric charges in said vertical shift register.

4. An image pickup apparatus comprising a solid state image pickup device made up of a plurality of photoelectric transducers which are two-dimensionally arrayed in the horizontal and vertical directions, a vertical shift register for receiving signal electric charges of each photoelectric transducer and transferring the signal electric charges in the vertical direction, and a horizontal shift register for transferring the signal electric charges in said vertical shift register in the horizontal direction, clamp means for clamping an optical black level of said solid state image pickup device, and control means for driving and controlling said solid state image pickup device and for controlling said clamp means, wherein said control means has a driving function in a mode for sequentially transferring the signal electric charges, which have been transferred from said photoelectric transducer of said solid state image pickup device to said vertical shift register, to said horizontal shift register in synchronism with a transfer operation of said horizontal shift register, and a driving function in a mode for continuously transferring the signal electric charges, which have been transferred from said photoelectric transducer of said solid state image pickup device to said vertical shift register, to said horizontal shift register, and when transfer of electric charges in the mode for continuously transferring the signal electric charges, which have been transferred to said vertical shift register, to said horizontal shift register is performed in the number of times corresponding to at least the number of all register units constituting said vertical shift register thereby purging out useless electric charges in said vertical shift registers, clamp pulses supplied from said control means to said clamp means are stopped for a period from the time to start purging out the useless electric charges until said transfer of electric charges is ended after being repeated in the number of times corresponding to the sum of the number of all register units constituting the vertical shift register and m (m is one or more integer).

5. An image pickup apparatus comprising a solid state image pickup device made up of a plurality of photoelectric transducers which are two-dimensionally arrayed in the horizontal and vertical directions, a vertical shift register for receiving signal electric charges of each photoelectric transducer and transferring the signal electric charges in the vertical direction, and a horizontal shift register for transferring the signal electric charges in said vertical shift register in the horizontal direction, clamp means for clamping an optical black level of said solid state image pickup device, and control means for driving and controlling said solid state image pickup device and for controlling said clamp means, wherein said control means has a driving function in a mode for sequentially transferring the signal electric charges, which have been transferred from said photoelectric transducer of said solid state image pickup device to said vertical shift register, to said horizontal shift register in synchronism with a transfer operation of said horizontal shift register, and a driving function in a mode for continuously transferring the signal electric charges, which have been transferred from said photoelectric transducer of said solid state image pickup device to said vertical shift register, to said horizontal shift register, and when transfer of electric charges in the mode for continuously transferring the signal electric charges, which have been transferred to said vertical shift register, to said horizontal shift register is performed in the number of times equal to or less than the number of all register units constituting said vertical shift register thereby purging out useless electric charges in said vertical shift register, clamp pulses supplied from said control means to said clamp means are stopped for a period given by both the period of purging out the useless electric charge and a number m (m is one or more integer) of horizontal periods after the purge of the useless electric charges.

* * * * *